United States Patent [19]

Nakaki et al.

[11] Patent Number: 5,040,509
[45] Date of Patent: Aug. 20, 1991

[54] CONTROL SYSTEM FOR CONTROLLING SPARK TIMING FOR ENGINE

[75] Inventors: Kazuyoshi Nakaki; Masaaki Matsukado; Yoshiharu Sugiyama; Yuji Matsuno, all of Hiroshima, Japan

[73] Assignee: Mazda Motor Corporation, Hiroshima, Japan

[21] Appl. No.: 526,654

[22] Filed: May 22, 1990

[30] Foreign Application Priority Data

May 25, 1989 [JP] Japan .................................. 1-132430

[51] Int. Cl.$^5$ ................................................ F02P 5/15
[52] U.S. Cl. .................................................. 123/422
[58] Field of Search ............... 123/416, 417, 418, 422, 123/423

[56] References Cited

U.S. PATENT DOCUMENTS

| 4,448,163 | 5/1984 | Yoshida | 123/422 |
| 4,844,026 | 7/1989 | Tomisawa | 123/422 |
| 4,852,537 | 8/1989 | Nagano et al. | 123/422 X |
| 4,887,573 | 12/1989 | Fujiwara et al. | 123/422 |
| 4,909,224 | 3/1990 | Nishiyama et al. | 123/422 X |
| 4,924,832 | 5/1990 | Abe | 123/422 X |

Primary Examiner—Willis R. Wolfe
Attorney, Agent, or Firm—Fish & Richardson

[57] ABSTRACT

A control system for controlling the timing for sparking an engine is adapted to retard a spark timing in a predetermined amount at the time of accelerating. An amount of retarding the spark timing at the time of accelerating is set to be gradually increased and then to be gradually decreased. The retarding amount at the time of accelerating is preferably changed in each spark cycle, namely, in each spark timing.

13 Claims, 4 Drawing Sheets

| ADDRESS (SPARKING CYCLE) | AMOUNT OF RETARD | GUARD VALUE |
|---|---|---|
| n = 10 | IGA (10) | IGG (10) |
| n = 9 | IGA (9) | IGG (9) |
| ⋮ | ⋮ | ⋮ |
| n = 1 | IGA (1) | IGG (1) |

CONTROL SYSTEM FOR CONTROLLING SPARK TIMING FOR ENGINE

BACKGROUND OF THE INVENTION

1. Field of the Invention

The present invention relates to a control system for controlling the timing for making an electric spark in the engine of a vehicle.

2. Description of Related Art

There is the increasing tendency that engines, particularly engines for automobiles, are designed to retard the timing for sparking when the knocking of the engine is sensed by a knocking sensor.

Control of the ignition timing by using the knocking sensor is not sufficient to fully prevent the knocking because the control is implemented after the knocking has occurred. Hence, it has been proposed that the ignition timing be retarded in a predetermined amount in anticipation when a running state is sensed in which the knocking is likely to occur. Japanese Patent Unexamined Publication (Kokai) No. 138,164/1988 discloses the technique in which the ignition timing is retarded in a predetermined amount in advance at the time of acceleration when the knocking may readily occur. And an amount of retarding the ignition timing is set to become largest at the time when acceleration is detected and to be decreased gradually to a smaller magnitude.

For conventional systems in which the amount of retarding the spark timing is set so as to become gradually smaller from the time when acceleration is detected, hesitation or a delay of causing acceleration may be likely to occur at the initial time of acceleration. This phenomenon has been found to occur because the amount of retarding the spark timing is apt to be excessive at the initial time of acceleration. More specifically, as acceleration is detected, for example, by checking a variation in accelerator opening angles or a variation in amounts of intake air, the amount of intake air within the combustion chamber, i.e., a combustion pressure, may be increased with some delay in response. In other words, it can be said that the knocking is most likely to occur at a cylinder which is to be sparked after a few cylinders from the time when acceleration is detected. This means that the spark timing is retarded to an excessive extent at the cylinder to be sparked immediately before the cylinder which is most likely to cause knocking, so that the hesitation may occur as a result of this retarding in an excessive amount.

SUMMARY OF THE INVENTION

Therefore, the present invention has been performed under the circumstances as described hereinabove and has the object to provide a control system for controlling the spark timing of the engine adapted to prevent hesitation of acceleration resulting from retarding the spark timing to an excessive extent, given the spark timing being retarded in a predetermined amount at the time of accelerating.

In order to achieve the object, the present invention consists of a control system for controlling the timing for sparking the engine by retarding the spark timing in a predetermined amount at the time of accelerating, wherein an amount of retarding the spark timing at the time of accelerating is set to be gradually increased and then to be gradually decreased.

The arrangement as described hereinabove can permit a prevention of knocking resulting from acceleration and provide satisfaction in acceleration by preventing the spark timing from being retarded in an excess amount in an initial stage of acceleration.

Other objects, features and advantages of the present invention will become apparent in the course of the description of the preferred embodiments which follows, in conjunction with the accompanying drawings.

DETAILED DESCRIPTION OF THE PREFERRED EMBODIMENTS

The present invention will be described more in detail in conjunction with the accompanying drawings.

Figure 1:
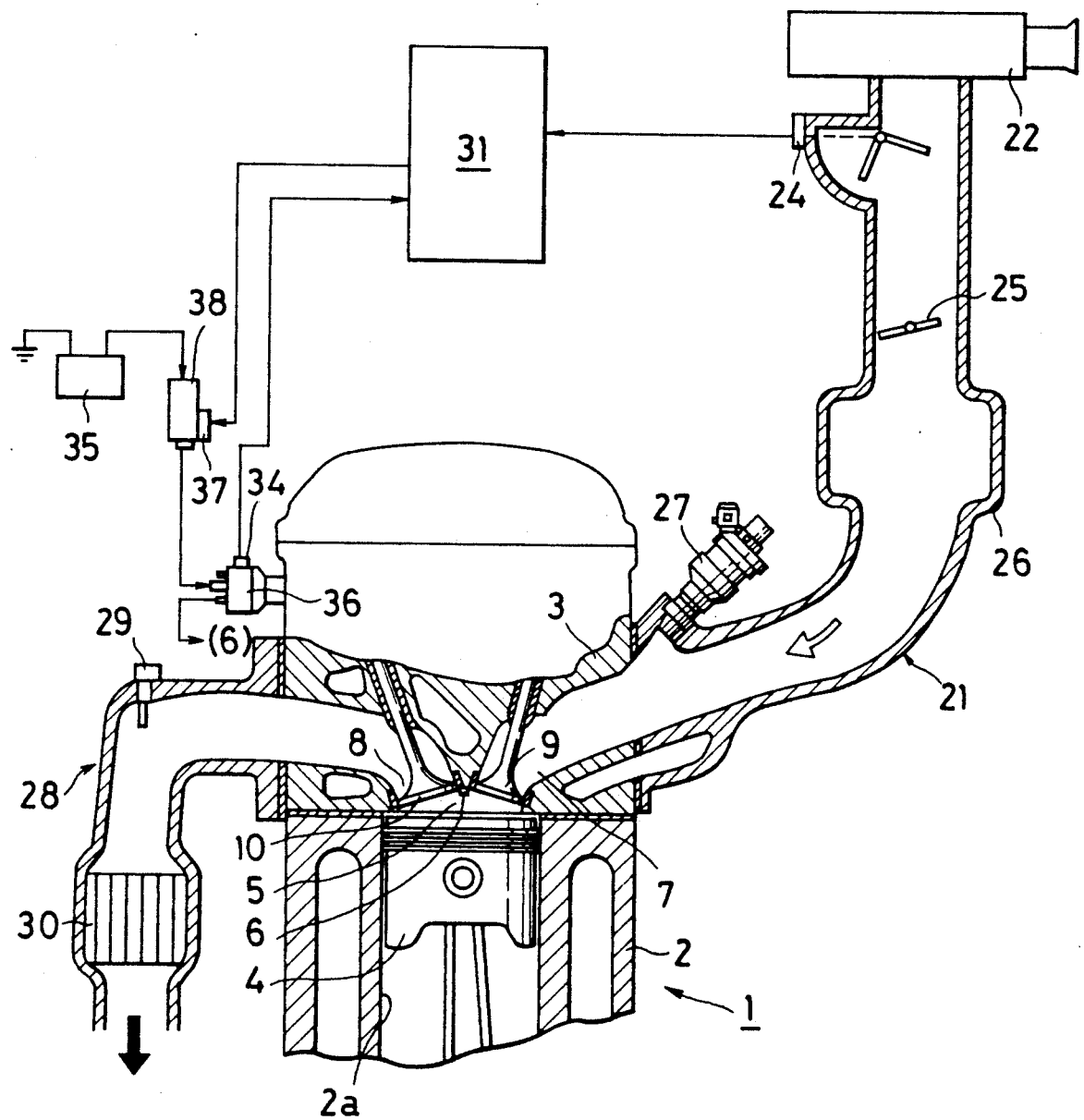
FIG. 1 is a schematic diagram in section showing a system according to an embodiment of the present invention.

As shown in FIG. 1, reference numeral 1 denotes a main body of an engine of an Otto type that the engine is of a four-cycle reciprocating type. As is known to the art, the main body 1 of the engine is provided with a combustion chamber 5 defined by a cylinder block 2, a cylinder head 3 and a piston 4 which is inserted into a cylinder 2a of the cylinder block 2. The combustion chamber 5 is provided with a spark plug 6 and has openings to an air intake port 7 and an exhaust port 8. The intake port 7 and the exhaust port 8 are arranged so as to be opened or closed by an air intake valve 9 and an exhaust valve 10, respectively, at the timing known to the art in synchronization with an output shaft of the engine.

An air intake passage 21 communicated with the air intake port 7 is provided in order from the upstream side to the downstream side with an air cleaner 22, an air-flow meter 24 for sensing an amount of intake air, a throttle valve 25, a surge tank 26, and a fuel injection valve 27. An exhaust passage 2b communicated with the exhaust port 8 is provided in order from the upstream side to the downstream side with a air-fuel sensor 29, and a three way catalyst 30 as a device for cleaning exhaust gases.

As shown in FIG. 1, reference numeral 31 denotes a control unit composed of a microcomputer, which signals enter from switches and sensors 32, 33 and 34, in addition to signals from the air-flow meter 24. The switch 32 is an idle switch for detecting the full closure of the throttle valve 25. The sensor 33 is to sense the temperature of a coolant for cooling the engine. The sensor 34 is disposed at a distributor 36 and is to sense a crank angle, i.e., the number of revolutions of the engine.

The control unit 31 generates a given signal to an igniter 37. In other words, as the given signal for indicating the spark timing is generated to the igniter 37 from the control unit 31, primary electric current of a spark coil 38 is blocked to thereby generate a high voltage on its secondary side and the high voltage on the secondary side is fed to a spark plug 6 through the distributor 36.

Figures 2, 3:
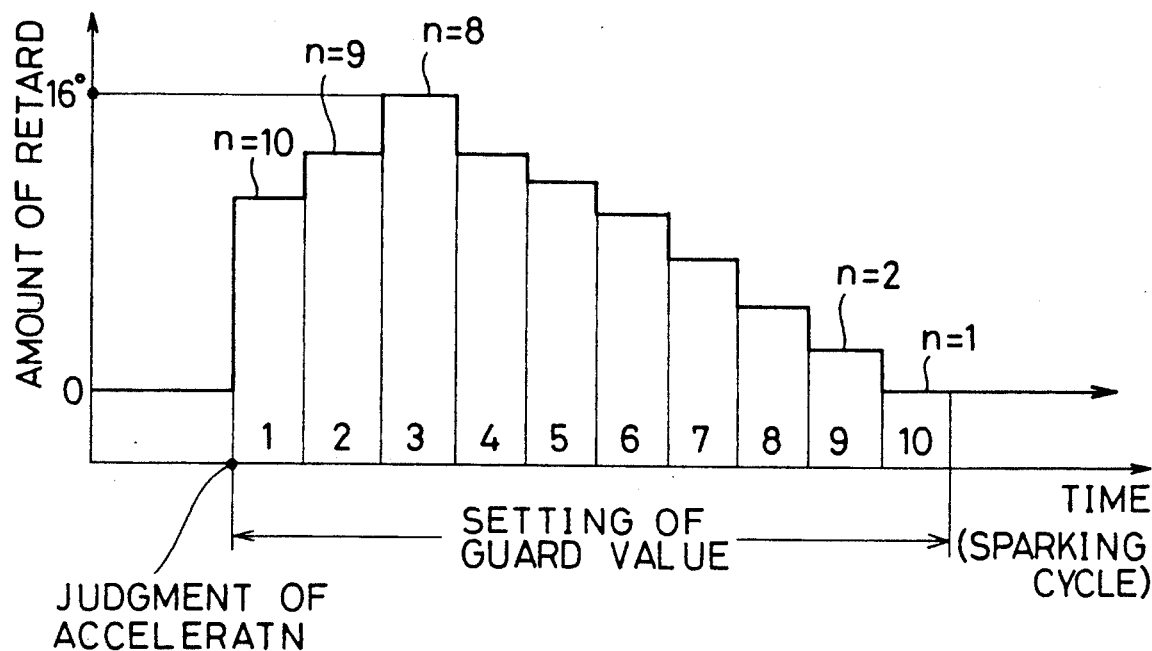
FIG. 2 is a diagrammatic representation showing a control content according to the present invention.
FIG. 3 is a map storing the retarding amount and the guard-value.

Description will be made of an outline of control by means of the control unit 31 in conjunction with FIG. 2.

The spark timing is controlled at the time of accelerating for 10 times of sparks, in this embodiment, after acceleration has been judged. The retarding amount is set so as to become gradually greater up to the third spark cycle (n=8) from the spark cycle (n=10) immediately after judgement of acceleration and thereafter to become gradually decreased so as to reach zero at the 10th spark cycle (n=1). More specifically, for instance, as shown in FIG. 2, the amount of retarding the spark timing is arranged so as to change so as to increase from the spark cycle immediately after judgment of acceleration at 13° through 16° to 20° and then decrease through 16°, 14°, 12°, 9°, 6° and 3° to zero. In this embodiment, in performing control of retarding the spark timing at the time of acceleration, a guard value is provided in advance for the final spark timing, thereby permitting a prevention of the final spark timing from being set on the retarding side from the guard value. Such a guard value is set for each of the spark cycles (n=10 to 1). The provision of these guard values can prevent the basic spark timing from being retarded to an excessive extent due to scattering of the spark timings. The amount of retarding the spark timing and the guard value are stored in a ROM of the control unit 31 for each spark cycle, as shown in FIG. 3.

Such a guard value is set herein particularly with the following points taken into account. The guard value is set so as to cause no misfire due to the retarding of the spark timing to an excessive extent in the case of the spark cycle ranging from n=10 to n=7. When the spark cycle ranges from n=6 to n=0, on the other hand, the guard value is set so as not to worsen acceleration because the problem of misfire is not needed to be taken into consideration.

Figure 4A:
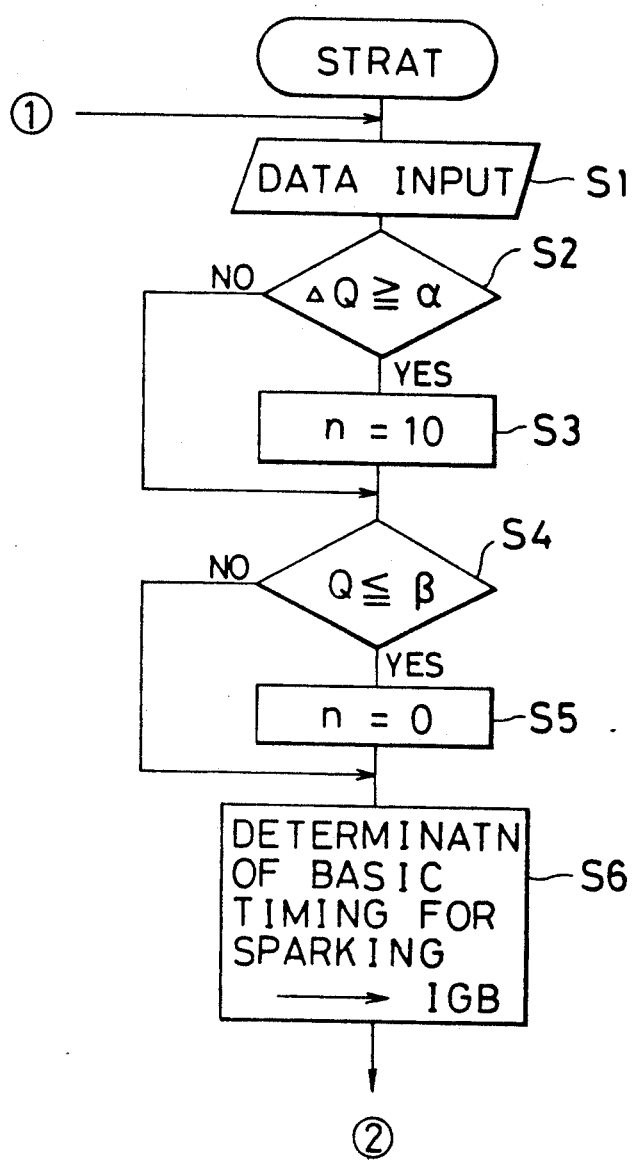
FIGS. 4A and 4B are flow charts showing control examples according to the present invention.
Figure 4B:
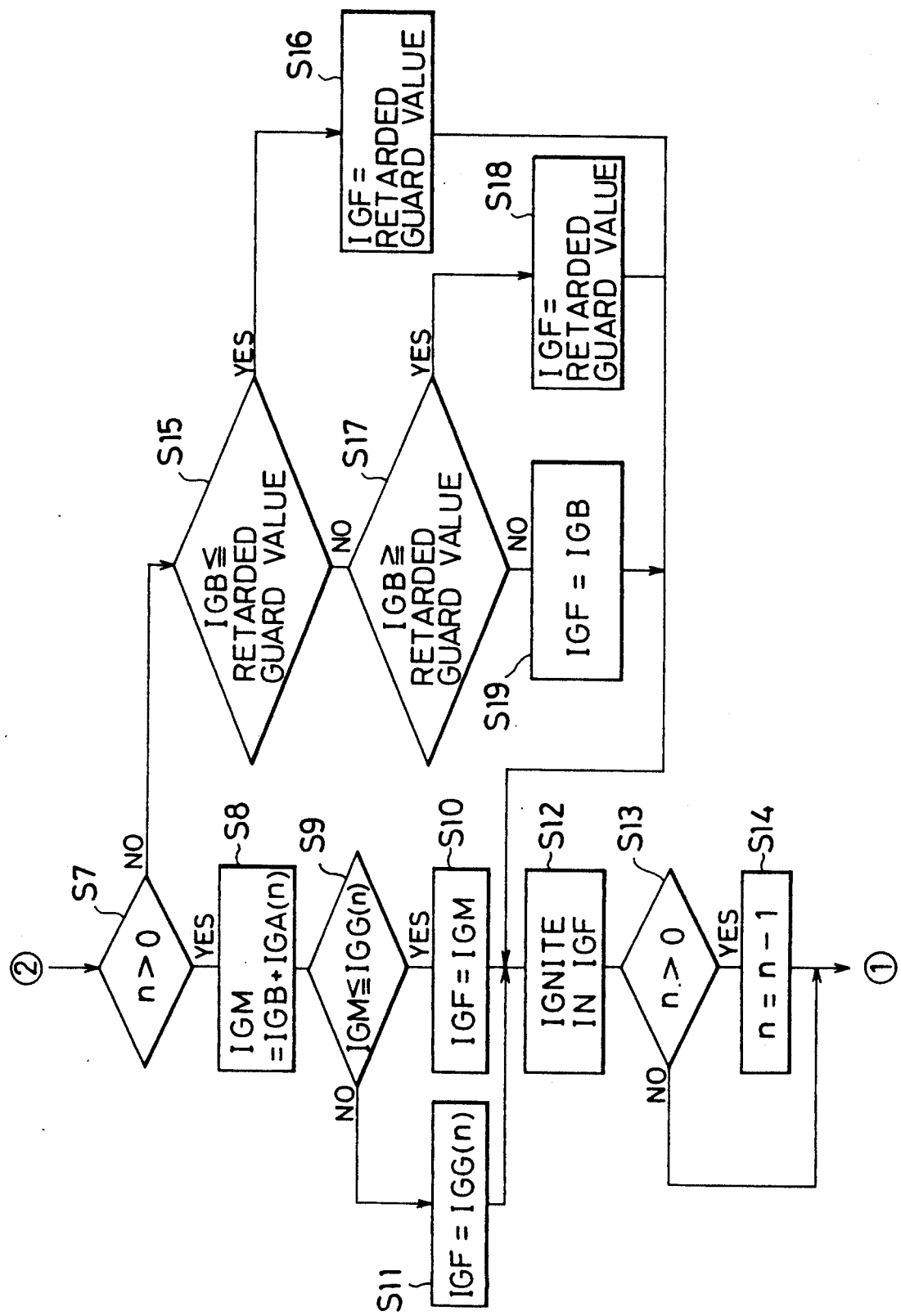

Description will be made more in detail of control of the spark timing with reference to the flow charts as shown in FIGS. 4A and 4B. It is to be noted, however, that description will be omitted on the time of idling and starting which do not relate to acceleration.

After signals from sensors are read at step S1, it is judged at step S2 that an amount of variation in an amount of intake air (increment), $\Delta Q$, is equal to or greater than a predetermined value $\alpha$, namely, whether it is at the time of accelerating. If YES in the decision at step S2, on the one hand, the cycle number, n, for the spark timing to be retarded is set to 10 at step S3 and then the flow proceeds to step S4. As described hereinabove, the cycle number n is arranged such that n is set to 10 for the spark timing immediately after judgement of acceleration and then it is decreased from 10 through 9, 8, ..., 1 to zero. The cycle number n being zero means that the control of retarding the spark timing for acceration has ceased. If NO in the decision ast step S2, on the other hand, the flow proceeds to step S4 without passage through step S3.

At step S4, it is decided whether or not an amount of intake air Q is equal to or less than a predetermined value $\beta$. When it is decided YES at step S4, the cycle number n is reset to zero and the flow goes to step S6. If NO at step S4, the flow proceeds to step S6 without passage through step S5. The processes at steps S4 and S5 are to retard the spark timing at the time of accelerating, given no possibility of causing knocking at the time of accelerating. At step S6, the basic spark timing IGB is determined on the basis of the amount of intake air Q and the number of revolutions of the engine in a manner known to the art.

Then at step S7, it is judged whether the cycle number n is greater than zero. When it is judged at step S7 that the cycle number n is grater than zero, it is decided that the spark timing be retarded at the time of accelerating. At this time, a corrected spark timing IGM is calculated by adding an amount of retarding the spark timing, IGA(n), or a retarding amount, corresponding to the cycle number n, to the basic spark timing IGB. In this embodiment, the spark timing is represented by a negative (−) value when it is prior to the top dead point (in the direction of advancing) while it is represented by a positive (+) value when it is after the top dead point. It is thus noted that the retarding amount IGA(n) is represented by the positive value. Thereafter, at step S9, the corrected spark timing IGM is judged whether or not to be equal to or lower than a guard value IGG(n) set for each cycle number n. When YES in the decision process at step S9, on the one hand, the corrected spark timing IGM is set at step S10 as a final spark timing. When NO in the decision process at step S9, on the other hand, the final spark timing IGF is set as a guard value IGG(n) at step S11 and then the engine is sparked in the final spark timing IGF at step S12.

After step S12, it is judged at step S13 whether or not the cycle number n is greater than zero. If YES in the decision process at step S13, on the one hand, the cycle number n is subtracted by one at step S14 in order to set the spark timing in the next spark cycle and then the flow is returned to step S1. If the decision at step S13 is NO, on the other hand, it is decided that the control of retarding the spark timing at the time of accelerating was finished and the flow is returned to step S1 as it was.

When the control of retarding the spark timing at the time of accelerating has been finished, the judgment at step S7 is NO and at this time the basic spark timing IGB may be set as the final spark timing IGF as it is. In this embodiment, however, the basic spark timing IGB is also provided with a guard value at both advancing and retarding sides, in order for the final spark timing IGF to fail to be set beyond the guard value. The processes at this end are executed at steps S15, S16, S17 and S18. When the basic spark timing IGB is not beyond the guard value, the basic spark timing IGB is set as it is as the final spark timing IGF.

It is to be understood that the foregoing text and drawings relate to embodiments of the present invention given by way of examples but not limitation. Various other embodiments and modifications are possible within the spirit and scope of the present invention.

What is claimed is:

1. A control system for controlling spark timing for an engine in a vehicle by retarding the spark timing by a predetermined amount at the time of acceleration, comprising acceleration detection means for detecting acceleration of the engine; and means for retarding the spark timing immediately upon detection of acceleration by the acceleration detection means and for setting an amount of retarding of the spark timing to be gradually increased at an initial stage and to be gradually decreased after the initial stage.

2. A control system as claimed in claim 1, further comprising an inhibition means for inhibiting the spark timing at the time of accelerating from being retarded when an engine load is smaller than a predetermined value.

3. A control system as claimed in claim 1, wherein the spark timing is retarded at the time of detection of acceleration when an increment of the engine load is equal to or greater than a predetermined amount.

4. A control system as claimed in claim 3, wherein a parameter indicating the engine load is set as an amount of intake air.

5. A control system as claimed in claim 1, wherein the amount of retarding the spark timing at the time at which acceleration is detected by the acceleration detection means is reset in each spark cycle.

6. A control system as claimed in claim 5, wherein the amount of retarding the spark timing in each spark cycle is stored in a memory means; and the amount of retarding the spark timing in accordance with a spark cycle is set as a retarding amount stored in the memory means.

7. A control means as claimed in claim 5, wherein the number of spark cycles for gradually increasing the amount of retarding the spark timing is smaller than the number of spark cycles for gradually decreasing the amount of retarding the spark timing.

8. A control system as claimed in claim 1, wherein a guard value is set in advance for a final spark timing to be obtained on the basis of a basic spark timing and an amount of retarding the spark timing at the time of accelerating.

9. A control system as claimed in claim 8, wherein the amount of retarding the spark timing at the time of detection of acceleration is set so as to be changed in each spark cycle; and further comprising a guard-value storing means for storing a guard value in each spark cycle and the guard value corresponding to a spark cycle is set as a guard value stored in the guard-value storing means.

10. A control system as claimed in claim 9, wherein a parameter indicating the engine load is set as an amount of intake air.

11. A control system as claimed in claim 1, further comprising:

a basic-spark-timing determining means for determining a basic spark timing;

a retarding means for retarding the spark timing by a predetermined portion from the basic spark timing determined by the basic-spark-timing determining means in a spark cycle by the predetermined number of times from the detection of acceleration;

a first memory means for storing a retarding amount at the time of detection of acceleration in each spark cycle of the predetermined number of times;

a second memory means for storing a guard value at the time of detection of acceleration in each spark cycle of the predetermined number of times;

a retarding-amount setting means for setting the retarding amount in each spark cycle to be retarded by the retarding means as a retarding amount to be stored in the first memory means; and a restriction means for restricting a final spark timing after being retarded by the retarding means so as not to exceed the guard value stored in the second memory means.

12. A control means as claimed in claim 11, wherein the retarding amount stored in the first memory means is set so as to be changed whenever the spark cycle is changed.

13. A control means as claimed in claim 12, wherein the number of spark cycles for gradually increasing the amount of retarding the spark timing is smaller than the number of spark cycles for gradually decreasing the amount of retarding the spark timing.

* * * * *